June 21, 1927.
G. A. MORRISON
TORCH
Filed July 3, 1926
1,633,265
2 Sheets-Sheet 1
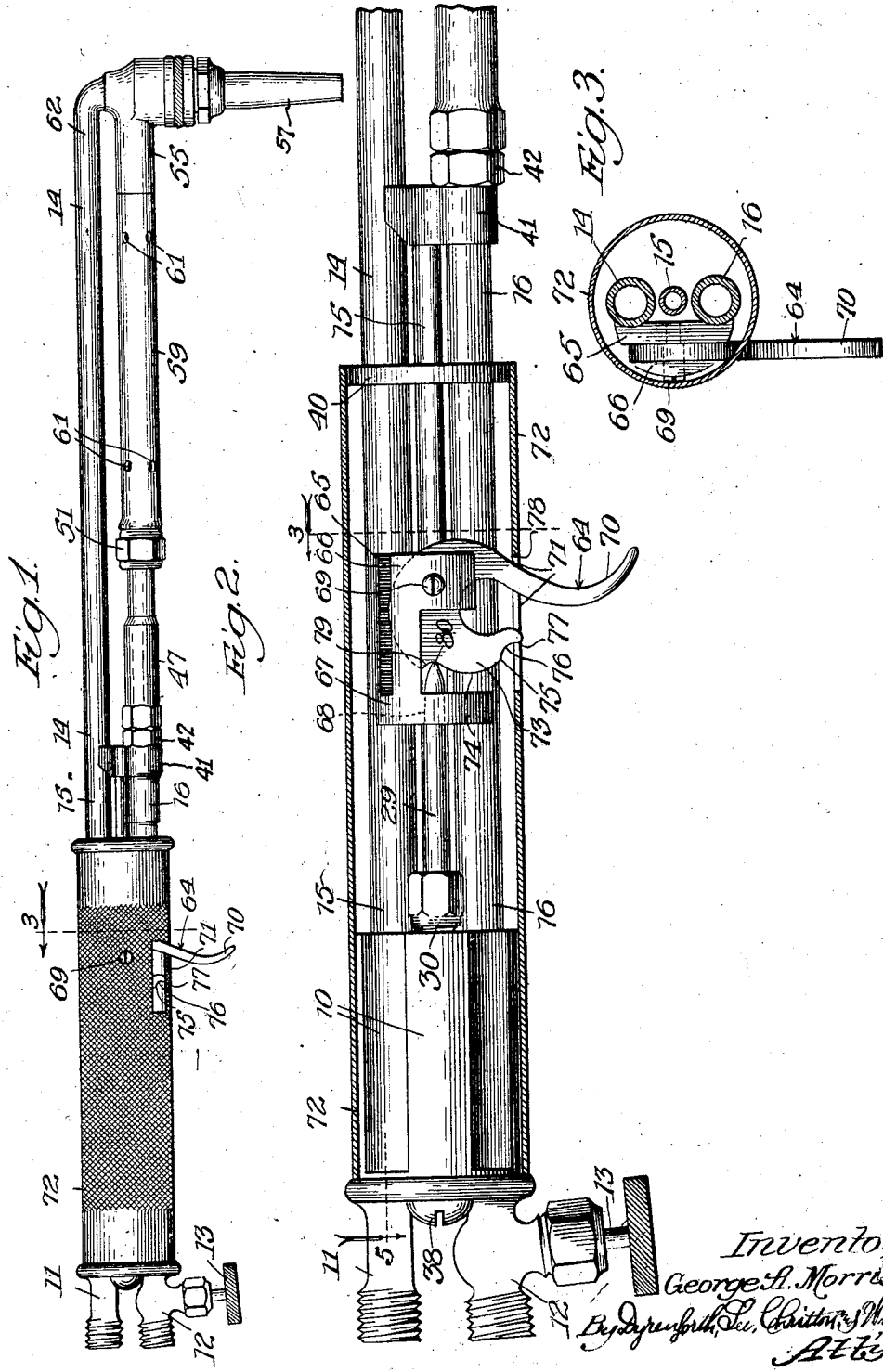
Inventor:
George A. Morrison June 21, 1927.
G. A. MORRISON
TORCH
Filed July 3, 1926
1,633,265
2 Sheets-Sheet 2
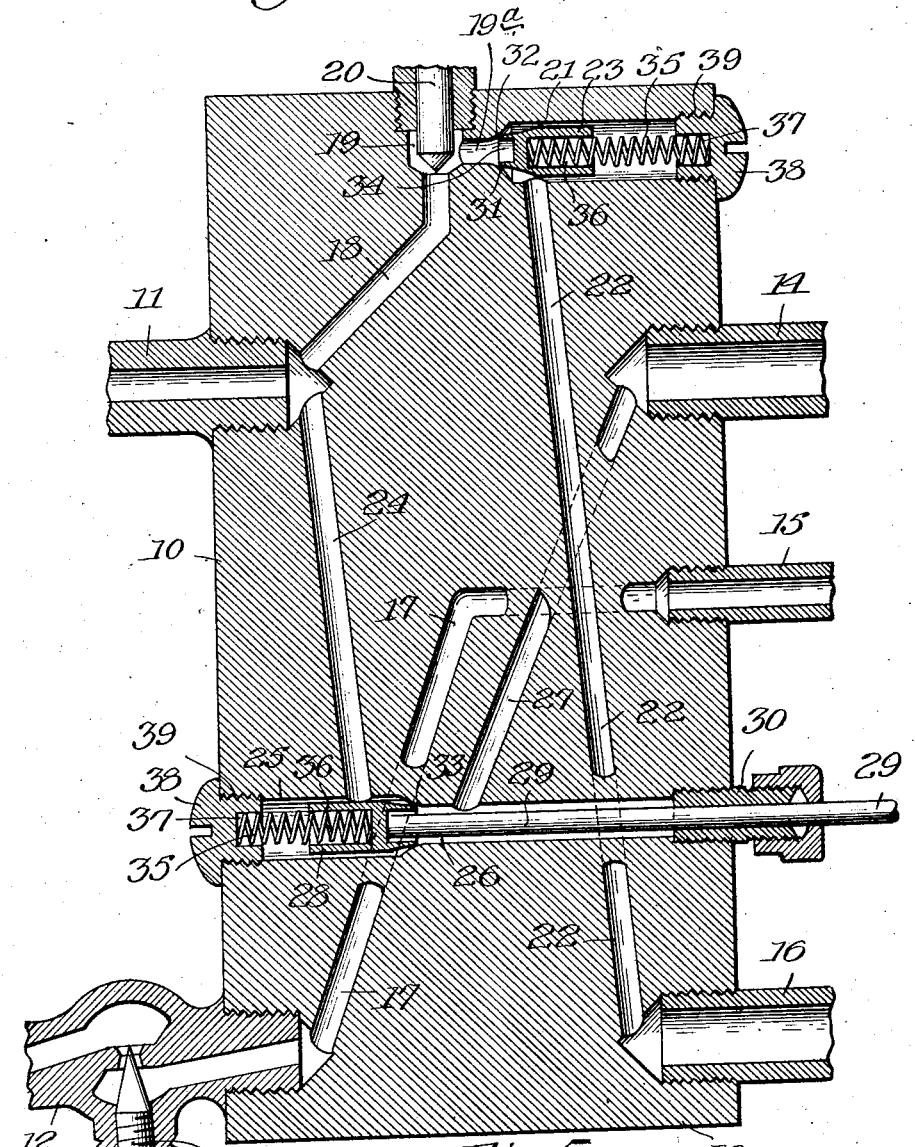
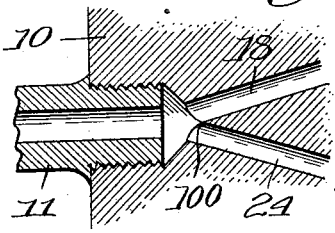
Inventor:
George A. Morrison, Patented June 21, 1927.

1,633,265

UNITED STATES PATENT OFFICE.

GEORGE A. MORRISON, OF PARK RIDGE, ILLINOIS, ASSIGNOR TO TORCHWELD EQUIPMENT CO., OF CHICAGO, ILLINOIS, A CORPORATION OF DELAWARE.

TORCH.

Application filed July 3, 1926. Serial No. 120,413.

My invention relates, more particularly, though not exclusively, to torches of the so-called oxyacetylene type and my objects, generally stated, are to so improve upon prior structures as to simplify them, render them more readily handled, and to ensure against leakage of the gas.

More specifically stated my object is to provide improved valve-controlling means, more particularly, though not exclusively, for use in connection with the valves of torches, which shall be of novel and simple construction and by which the valve may be readily manipulated; and other objects as will be manifest from the following description.

Referring to the accompanying drawings:—

Figure 1 is a view in side elevation of a cutting torch of the oxyacetylene type in which my improvements are incorporated. Figure 2 is an enlarged view in side elevation of the handle end of the torch, the shell being sectioned to disclose interior details. Figure 3 is a section taken at the line 3 on Figs. 1 and 2 and viewed in the direction of the arrows. Figure 4 is a sectional diagrammatic developed view of a portion of the torch, illustrating the various valve-controlled gas passages at the inlet end of the torch; and Figure 5 a section taken at the line 5 on Fig. 2 and viewed in the direction of the arrow.

The particular illustrated construction of torch in connection with which I have chosen to illustrate my improvements, comprises a body portion 10 equipped with pipe fittings 11 and 12 for connection, respectively, with supplies of oxygen and acetylene under pressure, the pipe 12 for the acetylene, being provided with a valve 13 shown as of the needle type for regulating the flow of acetylene therethrough and into the member 10. The body 10 at its forward end connects with pipes 14, 15 and 16, the pipe 14 being for high pressure oxygen, the pipe 15 for acetylene and the pipe 16 for low pressure oxygen.

The body 10 contains a bore 17 which communicates at one end with the pipe fitting 12 and at its opposite end with the pipe 15. The body 10 also contains a bore 18 which communicates at one end with the pipe fitting 11 and opens at its opposite end into a valve chamber 19 containing a needle valve 20 controlling the flow of oxygen through the bore 18; the chamber 19 opening into a bore 19$^a$ which, in turn, opens into a valve chamber 21 which latter communicates with one end of a bore 22 the opposite end of which communicates with the pipe 16, the valve chamber 21 containing a reciprocable valve 23 operating to prevent back pressure, should such occur in the bore 22, from entering the bore 18. The body 10 also contains a bore 24 communicating at one end with the pipe fitting 11 and opening at its other end into a valve chamber 25 in the body 10 which latter communicates by a bore 26 with one end of a bore 27 the opposite end of which opens into the pipe 14. The chamber 25 contains a reciprocable valve 28 controlling communication between the bore 24 and the bore 27, this valve being controlled by a rod 29 which extends lengthwise through the bore 26 and outwardly through a stuffing box 30 secured in the body 10.

As clearly shown in Fig. 5 the passages 18 and 24, where they open into the socket in which the fitting 11 is located, are separated by a knife-edge-wall, represented at 100, whereby the low-pressure bore 18, which supplies oxygen to the low pressure pipe 16, is prevented from becoming starved of oxygen when the valve 28 controlling the flow of oxygen to the high pressure pipe 14 is opened.

The valves 23 and 28 are of the same construction, each at the end thereof at which it engages with the cooperating seat being formed to provide a relatively thin flexible annular portion 31 which, in the seating of the valve in the valve seat, deforms to precisely conform with the inner surface of the valve seat and produce a gas-tight joint, the valve seats for these two valves being represented at 32 and 33, respectively, and flaring outwardly toward the respective valves, preferably upon a radius as shown and of such diameter as to receive the ends 31 of these valves within the space provided by these flaring portions, whereby as the valves are crowded against the flaring surfaces of the seats the deformation of the portions 31 as, and for the purpose, stated, is effected. The portions 31 of these valves may be formed, as shown, by recessing the ends of the valves as represented at 34, with their outer surfaces preferably tapering as shown, these valves being made of any suitable material, having such characteristics that it will deform as stated, as for example bronze. Both of these valves are shown as spring-pressed toward the seats with which they respectively cooperate, these springs being indicated at 35 and shown as extending into sockets 36 in the valves and into sockets 37 in plugs 38 screwed into openings 39 in the body 10. The valve 23, being a back-pressure valve, closes in the direction of back-pressure in the bore 22, or in other words, in opposition to the normal flow of the gas through the body 10, and back-pressure generated in the bore 22 and entering the chamber 21 behind the valve 23 operates to forcibly crowd this valve against the seat 32. The valve 28 closes in the direction of the flow of oxygen through the bore 24, the oxygen entering the valve chamber 25 and by exerting its pressure against the rear end of the valve 28 normally crowds the latter into close engagement with the seat 33. Thus when the torch is used for welding purposes acetylene normally flows through the pipe-fitting 12 and bore 17 to pipe 15, and oxygen flows through the pipe-fitting 11 and bore 18, thence past the valve 23 and into bore 22, to pipe 16, the valves 13 and 20 being set to supply to the pipes 14 and 16 the acetylene and oxygen in the desired proportions. When it is desired to use the torch as a cutting torch, a high pressure flow of oxygen is supplied to the pipe 14, by opening the valve 28.

The pipes 14, 15 and 16 extend through openings in a spacer disk 40, the pipe 16 screwing into a fitting 41 into which the rear end of a mixing chamber device 42 is screwed, the chamber in this device communicating with the pipes 15 and 16. The forward end of the mixer device 42 has screw-threaded engagement, between its ends, with a pipe-member 47. It may be here stated that this mixer-device serves to mix the oxygen and acetylene supplied thereto through the pipes 15 and 16 for delivery to the pipe member 47 beyond the mixer.

The pipe 47 extends into and is connected at its forward end, with a coupling sleeve 51 which opens into a pipe (not shown) the forward end of which communicates with a head 55 opening into the burner tip 57, the mixed gases discharging from the head 55 into and through the burner tip.

To prevent overheating of the torch in advance of the mixing chamber I provide a pipe 59 which extends between the fitting 51 and the head 55 and surrounds the pipe therebetween in spaced relation thereto, the pipe 59 being suitably perforated at intervals, as for example as represented at 61, to permit of the circulation of air through the chamber (not shown) between the pipe 59 and the inner pipe which communicates with the head 55 and thereby maintain the inner pipe in relatively cool condition.

The pipe 14 is connected at its forward end with an angle pipe section 62 which opens into the central passage (not shown) of the burner-tip 57 and through which high-pressure oxygen is supplied to the burner-tip, under the control of the operator when a flame necessary for producing a cutting operation is to be produced at the burner-tip, the supply of the high-pressure oxygen to the pipe 14 being effected by opening the valve 28 by shifting the rod 29 to the left in Figs. 2 and 4.

The means for manually controlling the position of the valve 28 comprises a lever 64 extending between, and pivotally connected with, the arms 65 and 66 of a bracket-member 67 secured to the pipe 16 and containing an opening 68 therethrough in which the outer, rounded, end portion of the valve rod 29, is reciprocable, the pivot for the lever 64 being indicated at 69. The lever 64 is in the form of a trigger-device having a depending finger-grip portion 70 which projects downwardly through a slot 71 in a shell 72 surrounding the body member 10 and the disk 40 and held in place thereon by the screw 69 forming the pivot for the lever 64. The lever 64 is formed with a nose-portion 73 which directly opposes the rounded outer end of the valve rod 29, and is formed with a cam-surface 74 adapted to ride against the outer end of this rod and force the latter to the left in Figs. 1, 2 and 4 to open the valve 28 against the resistance of the spring 35 cooperating therewith, when the lever 64 is rocked in clockwise direction in Fig. 2. This cam is so shaped that when the lever 64 is in the position shown in Fig. 2 the valve 28 is closed and when this lever is rocked in clockwise direction to extreme position this valve is in open or abnormal position. The cam-surface 74, beyond its highest part, represented generally at 75, is so formed that when the lever 64 is moved to a position to open the valve 28 the pressure of the rod 29 against the edge of the nose 73 prevents reverse rocking of the lever 64 when the operator discontinues pressure on the finger grip 70. In the particular arrangement shown this result is accomplished by forming the edge of the nose, beyond the highest part 75 of the cam, with a recess 76 which receives the rounded end of the valve rod 29 at the end of the valve-opening movement, the end wall 77 of this recess forming a stop, cooperating with the rounded end of this valve rod to retain the trigger lever 64 in set or valve open position.

Inasmuch as the shell 72 is preferably of relatively thin metal and repeated striking of the lever 64 against the end wall 78 of the slot 71 would batter the shell and tend to loosen it, I provide means whereby the lever 64 when turned in counterclockwise direction by the operator to permit the valve 28 to close, will not strike this end wall, but will strike a part which will not be damaged by the impact, it being understood that when the operator trips the lever 64 to permit the valve 28 to close, the lever 64, due to the high pressure of the oxygen against the valve 28 and tending to close the latter, will be forcibly rotated in counterclockwise direction. The means shown for the purpose above stated comprise a shoulder 79 on the nose 73 of the lever beyond the lowest point 80 of the cam, this shoulder, which strikes the rounded end of the valve rod 29, being so disposed that the lever 64 cannot strike the wall 78 of the slot.

While I have illustrated and described a particular construction showing the preferred forms of embodiment of my improvements, I do not wish to be understood as intending to limit my invention thereto, as the same may be variously modified and altered without departing from the spirit of my invention.

What I claim as new and desire to secure by Letters Patent, is:

1. In combination, a valve device comprising a reciprocable valve proper having a stem, a pivotally supported lever for operating said valve comprising a cam portion for engaging said stem and provided with means at the opposite ends of said cam portion adapted to engage said stem and operate as stops, and a spring yieldingly forcing said stem against said cam portion.

2. In combination, a valve device comprising a reciprocable valve proper having a stem, a pivotally supported lever for operating said valve comprising a cam portion for engaging said stem and having a stop portion at one end of said cam portion adapted to engage said stem and limit rotation of said lever in one direction and a stop at the other end of the cam portion adapted to engage said stem and limit the rotation of said lever when reversely rotated.

3. In a gas-burning device comprising a fluid-passage-equipped member, a shell surrounding said member and containing a slot, and a valve controlling said passage and yieldingly forced in one direction, means for controlling said valve comprising a pivoted lever extending through said slot and provided with a stop-forming portion operating to prevent said lever from striking the end wall of said slot.

4. In a gas-burning device comprising a fluid-passage-equipped member, a shell surrounding said member and containing a slot, and a valve controlling said passage and yieldingly forced in one direction, means for controlling said valve comprising a pivoted lever extending through said slot and having a cam surface for engaging said valve, said lever having a stop-forming portion operating to prevent said lever from striking the end wall of said slot.

5. In a gas-burning device comprising a fluid-passage-equipped member, a shell surrounding said member and containing a slot, and a valve controlling said passage and yieldingly forced in one direction, means for controlling said valve comprising a pivoted lever extending through said slot and provided with a stop-forming portion adapted to engage said valve and operating to prevent said lever from striking the end wall of said slot.

6. In a gas-burning device comprising a fluid-passage-equipped member, a shell surrounding said member and containing a slot, and a valve controlling said passage and yieldingly forced in one direction, means for controlling said valve comprising a pivoted lever extending through said slot and having a cam surface for engaging said valve, said lever having a stop-forming portion adapted to engage said valve and operating to prevent said lever from striking the end wall of said slot.

7. In a gas-burning device comprising a fluid-passage-equipped member, a shell surrounding said member and containing a slot, and a valve controlling said passage and yieldingly forced in one direction, means for controlling said valve comprising a pivoted lever extending through said slot and having a cam surface for engaging said valve, said lever having a stop at the lowest portion of said cam surface operating to prevent said lever from striking the end wall of said slot.

8. In a gas-burning device comprising a fluid-passage-equipped member, a shell surrounding said member and containing a slot, and a valve controlling said passage and adapted to be yieldingly forced in one direction, means for controlling said valve comprising a pivoted lever extending through said slot and having a cam surface for engaging said valve, said lever having a stop at the lowest portion of said cam surface adapted to engage said valve and operating to prevent said lever from striking the end wall of said slot.

9. In a gas-burning device comprising a fluid-passage-equipped member, and a valve controlling said passage and adapted to be yieldingly forced in one direction, means for controlling said valve comprising a pivoted lever having a cam surface adapted to engage said valve and force it out of normal position and to a set position and a surface beyond the highest point of said cam so shaped as to maintain said lever in its abnormal or set position and a stop portion on said lever adapted to engage said stem and limit the rocking of said lever to a position in which said last-referred-to surface and the cam surface move out of engagement with said valve.

10. In a gas-burning device comprising a fluid-passage-equipped member, and a valve controlling said passage and adapted to be yieldingly forced in one direction, means for controlling said valve comprising a pivoted lever having a cam surface adapted to engage said valve and force it out of normal position and a surface beyond the highest point of said cam so shaped as to maintain said lever in its position for holding the valve in its abnormal or set position and a stop portion on said lever adapted to engage said valve and limit the rocking of said lever to a position in which said last-referred-to surface and the cam surface move out of engagement with said valve.

11. In a gas-burning device comprising a fluid-passage-equipped member, and a valve controlling said passage and adapted to be yieldingly forced in one direction, means for controlling said valve comprising a pivoted lever having a cam surface adapted to engage said valve and force it out of normal position and a surface beyond the highest point of said cam so shaped as to maintain said lever in its position for holding the valve in its abnormal or set position, said lever containing a valve-receiving recess beyond the lowest part of said cam operating to limit the rocking of said lever in the direction for permitting the movement of said valve to normal position.

12. In a gas-burning device comprising a fluid-passage-equipped member, a shell surrounding said member and containing a slot and a valve controlling said passage and adapted to be yieldingly forced in one direction and into its abnormal position, means for controlling said valve comprising a pivoted trigger-lever extending through said slot, said lever having a cam surface for engaging said valve for moving the latter in opposition to the force tending to hold said valve in its normal position, said lever being provided adjacent the lowest portion of said cam with a shoulder adapted to engage said valve and prevent said lever from striking the end wall of said slot, said lever adjacent the highest portion of its cam containing a recess adapted to receive said valve and limit turning of said lever and yieldingly maintain said lever in its position for holding the valve in its abnormal or set position.

GEORGE A. MORRISON.